United States Patent
Chae

(10) Patent No.: US 11,042,127 B2
(45) Date of Patent: Jun. 22, 2021

(54) WATCH-TYPE MOBILE TERMINAL AND WIRELESS CHARGING APPARATUS

(71) Applicant: LG ELECTRONICS INC., Seoul (KR)

(72) Inventor: Subong Chae, Seoul (KR)

(73) Assignee: LG ELECTRONICS INC., Seoul (KR)

(\*) Notice: Subject to any disclaimer, the term of this patent is extended or adjusted under 35 U.S.C. 154(b) by 450 days.

(21) Appl. No.: 15/762,067

(22) PCT Filed: Nov. 5, 2015

(86) PCT No.: PCT/KR2015/011838
§ 371 (c)(1),
(2) Date: Mar. 21, 2018

(87) PCT Pub. No.: WO2017/051976
PCT Pub. Date: Mar. 30, 2017

(65) Prior Publication Data
US 2018/0259914 A1    Sep. 13, 2018

(30) Foreign Application Priority Data

Sep. 25, 2015 (KR) .................. 10-2015-0136110

(51) Int. Cl.
*G04G 19/00* (2006.01)
*G04G 17/04* (2006.01)
(Continued)

(52) U.S. Cl.
CPC ........... *G04G 17/045* (2013.01); *G04C 10/00* (2013.01); *G04G 17/04* (2013.01); *G04G 17/08* (2013.01);
(Continued)

(58) Field of Classification Search
CPC ...... G04G 17/045; G04G 17/08; G04G 17/04; G04G 19/00; G04C 10/00
See application file for complete search history.

(56) References Cited

U.S. PATENT DOCUMENTS

| 2015/0102879 A1* | 4/2015 | Jacobs ................ H01F 38/14 335/294 |
| 2015/0220109 A1* | 8/2015 | von Badinski ........ H02J 7/35 340/539.12 |

(Continued)

FOREIGN PATENT DOCUMENTS

| JP | 2006118925 | 5/2006 |
| JP | 2011036038 | 2/2011 |

(Continued)

OTHER PUBLICATIONS

PCT International Application No. PCT/KR2015/011838, Written Opinion of the International Searching Authority dated Jun. 27, 2016, 21 pages.

*Primary Examiner* — Sean Kayes
(74) *Attorney, Agent, or Firm* — Lee, Hong, Degerman, Kang & Waimey

(57) ABSTRACT

A watch-type mobile terminal comprises: a main body having a display unit mounted on the front side thereof; a band connected to the main body and wound around a wrist of a user; a battery mounted in the main body; and a wireless charging coil which is positioned in at least one of a side surface and the front surface of the main body and the band and has electric current flow according to a change in a surrounding magnetic field to charge the battery. The watch-type mobile terminal can be charged on the wrist of the user, without the need to be separated from the wrist, and can improve the charging efficiency by minimizing an electro- (Continued)

magnetic wave which is influenced by the human body, since the watch-type mobile terminal is at a certain distance away from the wrist.

5 Claims, 8 Drawing Sheets

(51) Int. Cl.
  *G04C 10/00* (2006.01)
  *H02J 50/10* (2016.01)
  *G04G 17/08* (2006.01)
  *H02J 7/02* (2016.01)
(52) U.S. Cl.
  CPC .............. *G04G 19/00* (2013.01); *H02J 7/025* (2013.01); *H02J 50/10* (2016.02)

(56) References Cited

U.S. PATENT DOCUMENTS

| | | | | |
|---|---|---|---|---|
| 2015/0364938 | A1* | 12/2015 | Lapetina | H01F 38/14 |
| | | | | 320/114 |
| 2017/0261942 | A1* | 9/2017 | Kato | G04B 37/1486 |
| 2018/0210491 | A1* | 7/2018 | Song | H01L 25/0657 |

FOREIGN PATENT DOCUMENTS

| | | |
|---|---|---|
| KR | 1020110040622 | 4/2011 |
| KR | 1020140120786 | 10/2014 |
| KR | 1020150025206 | 3/2015 |

* cited by examiner (a)   (b)

WATCH-TYPE MOBILE TERMINAL AND WIRELESS CHARGING APPARATUS

CROSS-REFERENCE TO RELATED APPLICATIONS

This application is the National Stage filing under 35 U.S.C. 371 of International Application No. PCT/KR2015/011838, filed on Nov. 5, 2015, which claims the benefit of earlier filing date and right of priority to Korean Application No. 10-2015-0136110, filed on Sep. 25, 2015, the contents of which are all hereby incorporated by reference herein in their entirety.

TECHNICAL FIELD

The present invention relates to a watch-type mobile terminal capable of charging the watch-type mobile terminal in a state of being worn on a user and increasing charging efficiency and a wireless charging apparatus.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Moreover, as a portable terminal is disseminated as a terminal carried by each person, various designs are applied to the portable terminal to express a unique character of the person. A traditional portable terminal is used while being held by a hand and is carried by a hand or is carried in a manner of being put into a pocket or a bag. While the portable terminal is carried, the portable terminal may be lost or damaged due to the dropping or the like. Moreover, it is not convenient to carry the portable terminal.

In order to resolve the problem, a wearable terminal of various types is appearing. For example, a watch-type portable terminal capable of being worn on a wrist, a portable terminal capable of being worn on a neck, a portable terminal capable of being worn on a waist, and the like are appearing. A size and a function of a wearable terminal may vary according to a wearing form.

A watch-type mobile terminal corresponds to a wearable device and plays a role of an accessory as well. Hence, it is necessary to minimize exposure of a terminal exposed to the external. Hence, there is a need for a watch-type mobile terminal capable of being charged in a wireless charging type instead of or in addition to a wired charging type.

Yet, according to a legacy wireless charging type, it may be able to have a good efficiency only when a watch-type mobile terminal is mounted on a precise position. And, since it is necessary to separate the watch-type mobile terminal from a wrist and mount the watch-type mobile terminal on a charging device to charge the watch-type mobile terminal, it is cumbersome.

DISCLOSURE OF THE INVENTION

Technical Task

An object of the present invention is to provide a watch-type mobile terminal capable of charging the watch-type mobile terminal in a state of being worn on a user and enhancing a charging efficiency and a wireless charging device.

Technical Solution

To achieve these and other advantages and in accordance with the purpose of the present invention, as embodied and broadly described, according to one embodiment, a watch-type mobile terminal includes a main body configured to have a display unit mounted on the front side of the main body, a band configured to be wound around a wrist of a user in a manner of being connected with the main body, a battery configured to be embedded in the main body, and a wireless charging coil configured to be positioned at least one selected from the group consisting of a side of the main body, the front side of the main body, and the band, the wireless charging coil configured to charge the battery by flowing electric current according to a change of a surrounding magnetic field.

The main body includes a first case positioned at the side of the main body, a second case coupled with a rear side of the first case, and a control panel including the battery in a manner of being formed between the first case and the second case and the wireless charging coil includes a first wireless charging coil positioned along an inner side of the first case or the first wireless charging coil formed with the first case in a form of a unibody and wound in a shape of a coil spring.

The first wireless charging coil can be deployed in a manner of being slanted in a direction of the front side of the main body.

The main body can include a first case positioned at the side of the main body, a second case coupled with a rear side of the first case, a third case coupled with the first case by covering a circumference of the display unit, and a control panel containing the battery in a manner of being formed between the first case and the second case and the wireless charging coil can include a second wireless charging coil positioned between the first case and the third case or the second wireless charging coil formed with the third case in a form of a unibody.

The display unit includes an image panel configured to output an image and a touch panel positioned at the front side of the image panel and the wireless charging coil can include a third wireless charging coil formed on the touch panel.

The wireless charging coil can further include a fourth wireless charging coil formed on the band. The fourth coil can include a plurality of spirals formed at a different position.

To further achieve these and other advantages and in accordance with the purpose of the present invention, according to a different embodiment, a wireless charging device of a watch-type mobile terminal including a wireless charging coil in a main body, a pair of bands, and an upper side or a side of the main body or a band includes a charging device housing configured to wrap around at least a part of the upper side of the main body or at least a part of the side of the main body, a power transmission coil of a spiral form deployed along a circumference of the charging device housing, and an auxiliary battery configured to supply power to the power transmission coil.

The charging device housing can include a first housing positioned at a side part of the main body and a second housing positioned at the front side of the main body.

The power transmission coil is positioned at the first housing and can include a first power transmission coil wound in a shape of a coil spring.

The power transmission coil can include a second power transmission coil positioned at a circumference part of the second housing.

The second housing can include an opening formed at a center position corresponding to a display unit positioned at the front side of the main body.

The power transmission coil includes a first power transmission coil positioned at the first housing and wound in a shape of a coil spring and a second power transmission coil positioned at a circumference part of the second housing. The auxiliary battery is embedded in the second housing and can be positioned at the inside of the second power transmission coil.

The charging device housing includes a first housing positioned at a side part of the main body and a bottom part of the first housing corresponding to a band part of the watch-type mobile terminal can be recessed.

The charging device housing includes a third housing coupled with an upper side of the band of the watch-type mobile terminal, the power transmission coil is positioned at the third housing, and the auxiliary battery can be positioned at a first housing or a second housing.

Advantageous Effects

According to one embodiment of the present invention, it is able to charge a watch-type mobile terminal in a state of being on a wrist of a user without separating the watch-type mobile terminal from the wrist and increase a charging efficiency by minimizing an electromagnetic wave influenced by a human body due to a distance from the wrist.

According to the present invention, since it is able to apply the watch-type mobile terminal not only to a magnetic induction scheme but also to a magnetic resonance scheme, it is able to apply various charging methods.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BEST MODE

Mode for Invention

Figure 1:
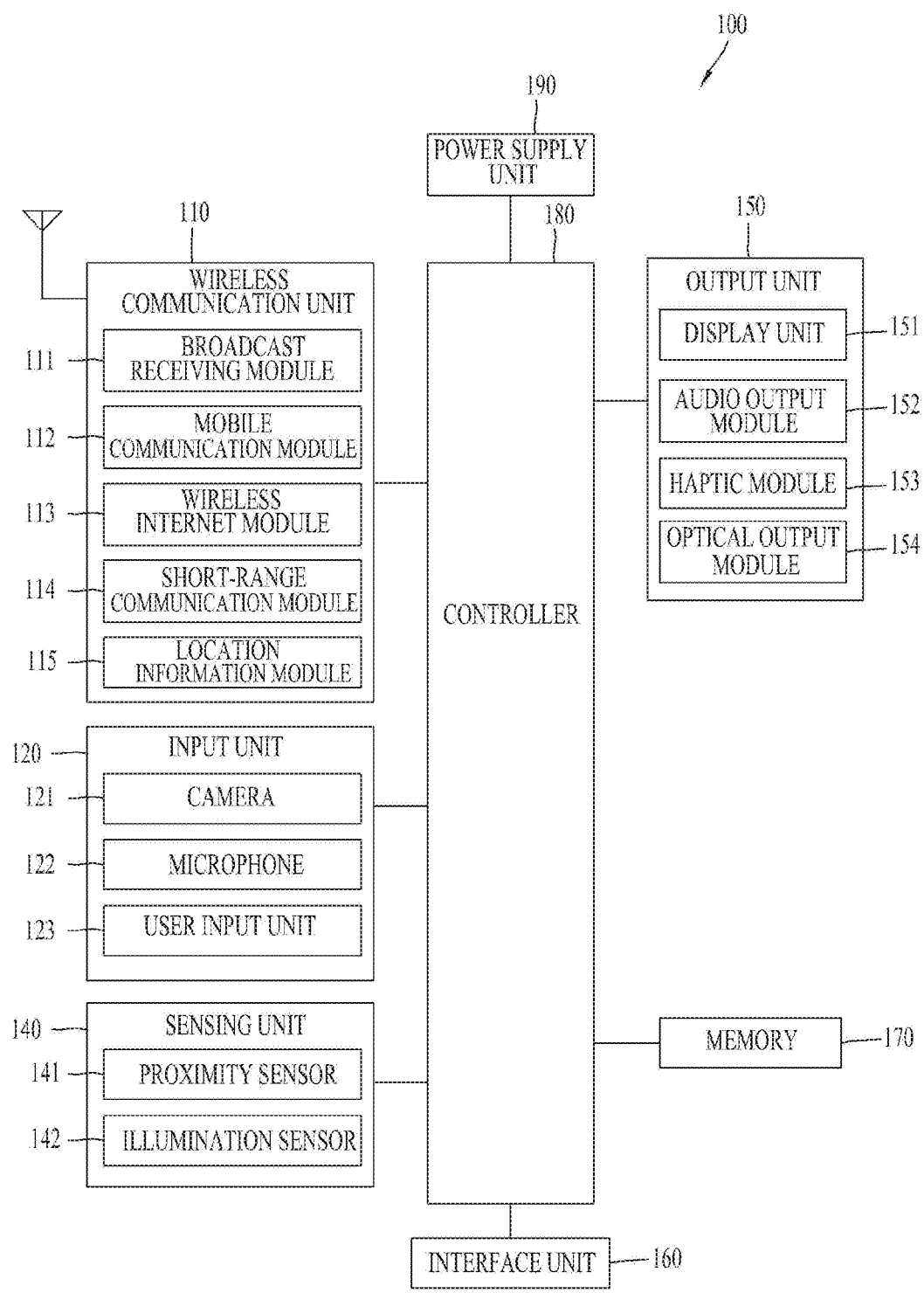
FIG. 1 is a block diagram of a watch type mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1 is a block diagram of a mobile terminal in accordance with the present disclosure.

The watch type mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in The FIG. 1A is not a requirement, and that greater or fewer components may alternatively be implemented.

More specifically, the wireless communication unit 110 typically includes one or more modules which permit communications such as wireless communications between the watch type mobile terminal 100 and a wireless communication system, communications between the watch type mobile terminal 100 and another mobile terminal, communications between the watch type mobile terminal 100 and an external server. Further, the wireless communication unit 110 typically includes one or more modules which connect the watch type mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The watch type mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the watch type mobile terminal 100 and a user, as well as function as the user input unit 123 which provides an input interface between the watch type mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the watch type mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the watch type mobile terminal 100 at time of manufacturing or shipping, which is typically the case for basic functions of the watch type mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the watch type mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
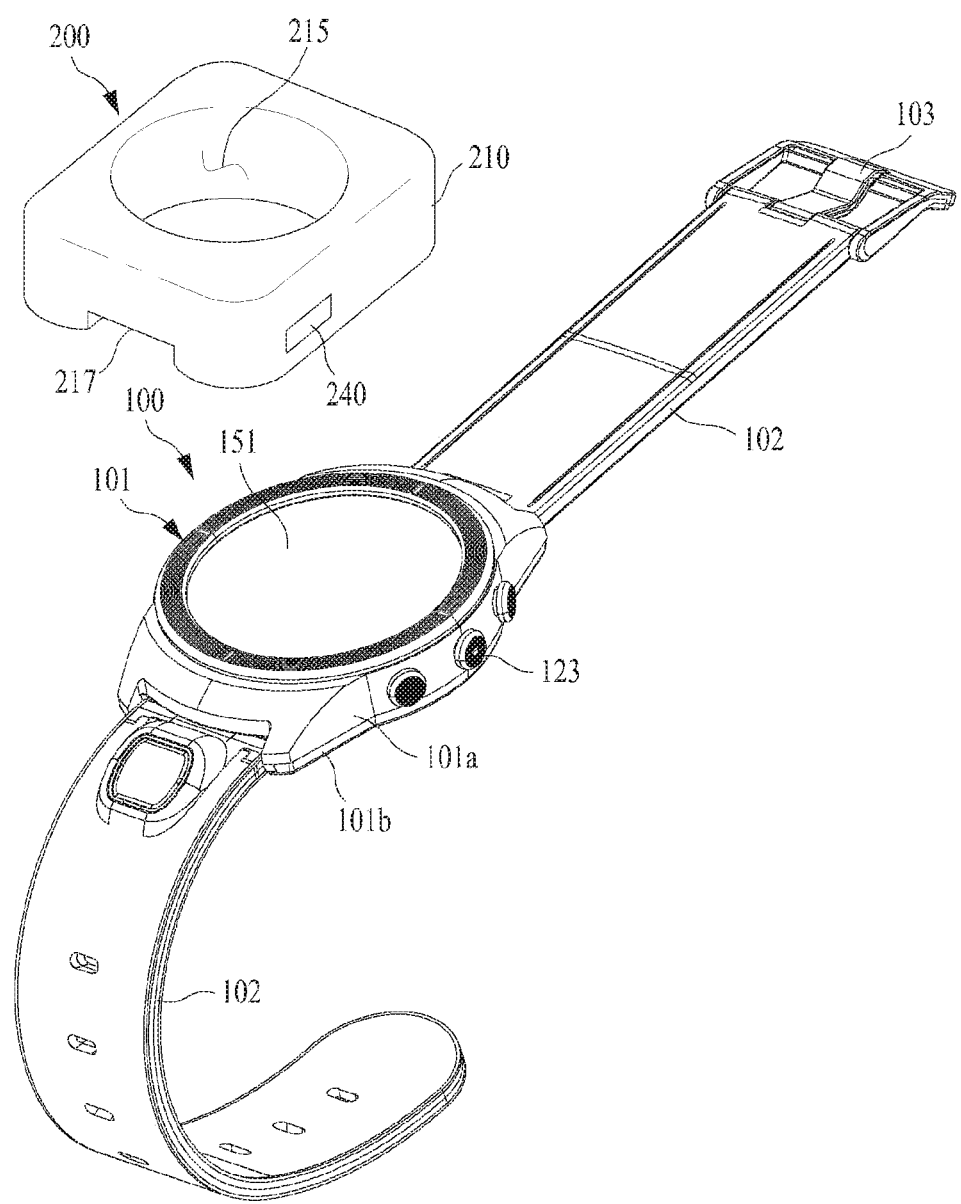
FIG. 2 is a perspective diagram for a watch-type mobile terminal and a wireless charging device according to the present invention.

FIG. 2 is a perspective diagram for a watch-type mobile terminal 100 and a wireless charging device 200 according to the present invention.

Referring to FIG. 2, a watch-type mobile terminal 100 includes a main body 101 equipped with a display unit 151 and a band 102 configured to be worn on a wrist in a manner of being connected with the main body 101.

The main body 101 includes a case that forms an appearance. As shown in the drawing, the case can include a first case 101a forming the side of the main body 101, a second case 101b positioned at the rear side of the main body 101, and a third case 101c positioned at the front side circumference of the main body 101. The cases 101a, 101b, 101c can be configured by a unibody. Or, the cases are divided into individual parts and can be coupled with each other to form the appearance of the main body 101.

A space surrounded by the cases 101a, 101b, 101c becomes a control panel on which a battery 191, a printed circuit board 185, a display unit 151, and the like are mounted.

The watch-type mobile terminal 100 is configured to perform wireless communication and an antenna for performing the wireless communication can be installed in the main body 101. Meanwhile, performance of the antenna can be enhanced using a case. For example, the antenna can be configured to extend a ground area or a radiation area in a manner of being electrically connected with a case including a conductive material.

The display unit 151 is deployed to the front side of the main body 101 to output information and a touch sensor is installed in the display unit 151 to implement the display unit as a touch screen. As shown in the drawing, a window 151a of the display unit 151 is installed in the first case 101a and forms a front side of the terminal body together with the first case 101a.

The main body 101 can include an audio output unit 152, a camera 121, a microphone 122, a user input unit 123, and the like. If the display unit 151 is implemented by a touch screen, since the display unit 151 is able to function as the user input unit 123, a separate key may not be installed in the main body 101.

A band 102 is configured to wrap around a wrist in a manner of being worn on the wrist. In order to make a user easily wear the watch-type mobile terminal, the band can be made of a flexible material. For example, the band can be made of leather, rubber, silicon, synthetic resins, etc. The band is configured to be detachable from the main body 101 to enable a user to change the band with a band of various forms according to the preference of the user.

Meanwhile, the band 102 can be used for enhancing performance of an antenna. For example, a ground extension unit (not depicted) configured to extend a ground area in a manner of being electrically connected with the antenna can be embedded in the band 102.

The band 102 can be equipped with a fastener 102a. The fastener 103 can be implemented by a buckle, a hook structure of which snap-fit is available, a Velcro, or the like. The fastener can include a section or a material of elasticity. The present drawing illustrates an example that the fastener is implemented by a buckle type.

Figure 3:
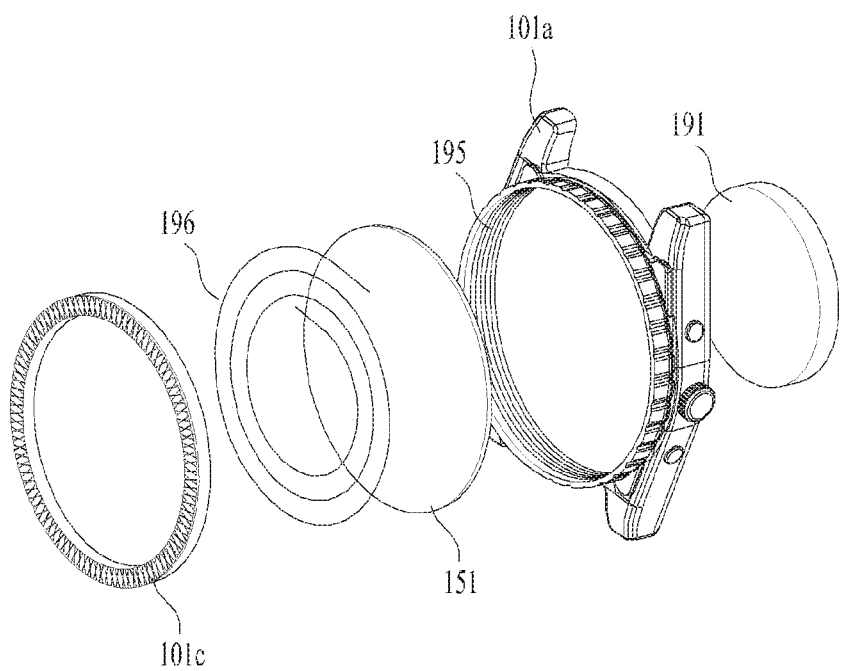
FIG. 3 is a cross-sectional diagram for a watch-type mobile terminal according to the present invention.

FIG. 3 is a cross-sectional diagram for a watch-type mobile terminal 100 according to the present invention. The watch-type mobile terminal 100 includes wireless charging coils 195, 196, 197, 198 for wireless charging. If a magnetic field near the wireless charging coils 195, 196, 197, 198 changes, electric current flows on the wireless charging coils 195, 196, 197, 198 and power occurred due to the flow of the electric current can be saved in the battery 191.

In general, the wireless charging coils 195, 196, 197, 198 are positioned at the rear side of the mobile terminal 100 and a user selects a wireless charging scheme to charge the mobile terminal 100 in a manner that the rear side of the mobile terminal 100 is contacted with a wireless charging device 200 of a cradle type put on a floor or a desk.

Yet, since the band 102 of the watch-type mobile terminal 100 is coupled with both ends of the main body 101 in a manner of being slantly extended in a rear side direction of the main body 101 in a stationary state, it is difficult to make the band 102 and the second case to be positioned at the same plane to put the second case of the mobile terminal 100 on the wireless charging device. In particular, it is unable to change an angle between the band 102 and the main body 101.

If the band 102 and the main body are connected through a hinge, it is able to unfold the band 102 to make the band to be flat with the rear side of the watch-type mobile terminal 100. However, a user should take off and put the watch-type mobile terminal 100 on the charging device to charge the watch-type mobile terminal. It is cumbersome.

A wireless charging scheme can be classified into a magnetic induction scheme and a magnetic resonance scheme. A currently released wireless charging device 200 uses the magnetic induction scheme. When the watch-type mobile terminal is positioned near power transmission coils 225, 226, 228 of the wireless charging device and is located within a magnetic field generated by the power transmission coils 225, 226, 228, the watch-type mobile terminal is charged. Although the magnetic induction scheme has a fast charging rate and a reliable charging rate, precise charging can be performed only when positions of the wireless charging coils 195, 196, 197, 198 are matched with positions of the power transmission coils 225, 226, 228. And, the magnetic induction scheme has a problem in that it is unable to charge a plurality of device at the same time.

The magnetic resonance scheme uses a strong magnetic coupling phenomenon between power transmission coils 225, 226, 228 of the wireless charging device 200 and wireless charging coils 195, 196, 197, 198 of the watch-type mobile terminal 100 having the same resonance frequency. Since the magnetic resonance scheme can transmit power to a wide area in a resonance frequency, although a position is not accurate, it may be able to charge a battery 191. When the magnetic resonance scheme is applied to the watch-type mobile terminal 100, if the wireless charging coils 195, 196, 197, 198 are deployed to the rear side of the watch-type mobile terminal, since the coils are contacted with a body of a user and the wireless charging coils 195, 196, 197, 198 are blocked by a wrist, a charging efficiency can be degraded.

In order to solve inconvenience and difficulty in wirelessly charging a watch-type mobile terminal according to a legacy method, the present invention provides a new arrangement method of wireless charging coils 195, 196, 197, 198 and a wireless charging device 200 of a new form according to the new arrangement method.

FIG. 3 illustrates a part of the main body 101 of the mobile terminal 100 according to the present invention. Referring to FIG. 3, an appearance of the main body 101 is formed by a first case 101a, a second case 101b, and a third case 101c. A control panel at which a battery 191 and a printed circuit board 185 are positioned is included in the inside of the cases. The first case 101a forms a side of the main body 101, the second case 101b is positioned at the rear side of the main body 101, and the third case 101c is positioned at the front side circumference of the main body 101. The display unit 151 according to the present invention is coupled with the first case 101a and can be fixed by the third case 101c.

The wireless charging coils 195, 196, 197, 198 of the watch-type mobile terminal 100 according to the present invention can include a first wireless charging coil 195 positioned at the first case 101a rather than the second case 101b and a second wireless charging coil 196 positioned at the third case 101c. The first wireless charging coil 195 and the first case 101a (or, an inner side of the first case 101a) can be formed as a unibody. The second wireless charging coil 196 can be positioned between the third case 101c and the first case 101a. Or, the second wireless charging coil 196 and the third case 101s can be formed as a unibody. The unibody means that the first case 101a or the third case 101c including coil is formed using a double injection molding scheme.

Either the first wireless charging coil 195 or the second wireless charging coil 196 can be equipped only. Or, both the first wireless charging coil 195 and the second wireless charging coil 196 can be equipped. If the wireless charging coils 195, 196, 197, 198 are positioned within a magnetic field, since electric current flows on the wireless charging coils 195, 196, 197, 198, it may be able to charge the battery 191.

As shown in FIG. 2, in order to charge the watch-type mobile terminal 100, it is able to use a wireless charging device 200 coupled with the front side of the watch-type mobile terminal 100. According to the present invention, since the wireless charging device 200 charges the watch-type mobile terminal 100 in a manner of covering the front side of the watch-type mobile terminal 100, it is able to charge the watch-type mobile terminal in a state that the watch-type mobile terminal is worn on a user.

In order to enable a user to use the display unit 151 positioned at the front side of the watch-type mobile terminal 100 while the watch-type mobile terminal 100 is charging, an opening corresponding to the display units 151 can be formed. A furrow corresponding to a shape of the front side of the watch-type mobile terminal 100 is formed on an inner side of a housing 210 of the wireless charging device 200. As shown in FIG. 2, a part of the wireless charging device overlapped with the band 102, i.e., a part 217 corresponding to the band 102 of the watch-type mobile terminal 100 can be formed in a manner of being dent.

Since the wireless charging device 200 according to the present invention has an auxiliary battery 230 in the inside of the wireless charging device, it is easy to carry the wireless charging device 200. The wireless charging device can include a charging terminal 240 for charging the auxiliary battery 230.

Figure 4:
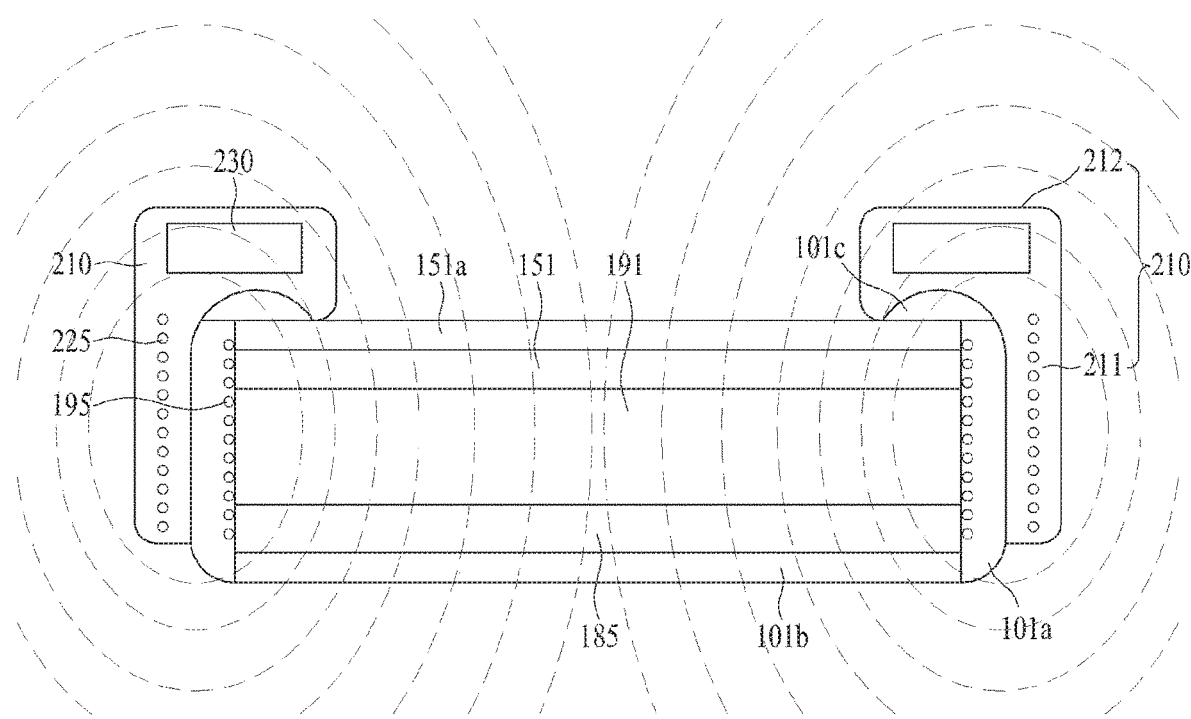
FIGS. 4 to 6 are diagrams illustrating an embodiment of a watch-type mobile terminal and a wireless charging device according to the present invention.
Figure 5:
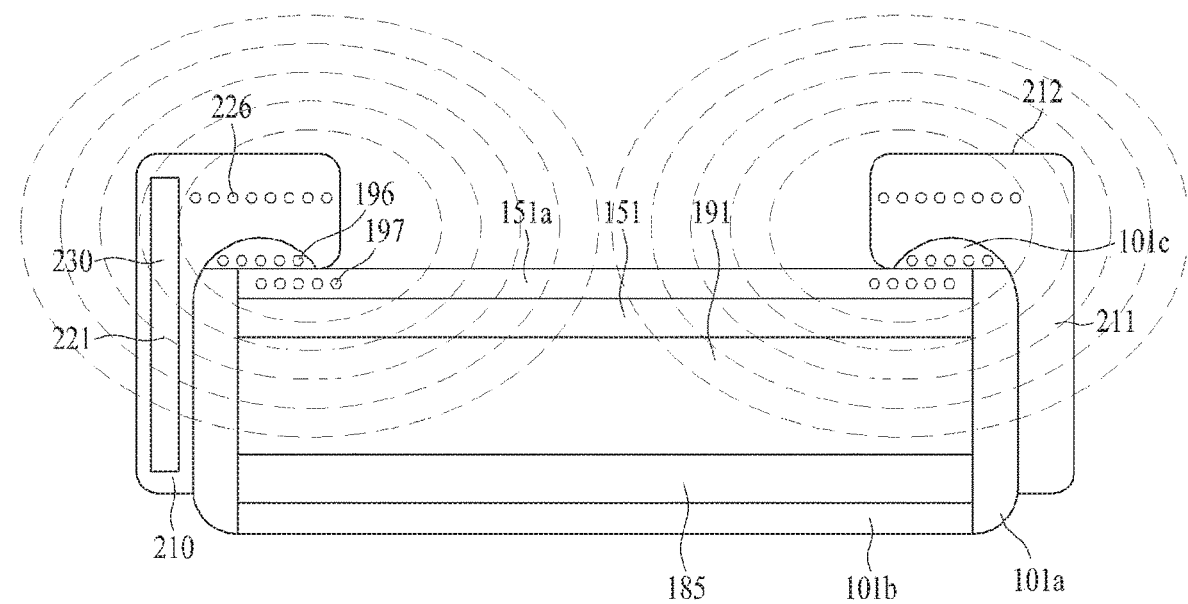
Figure 6:
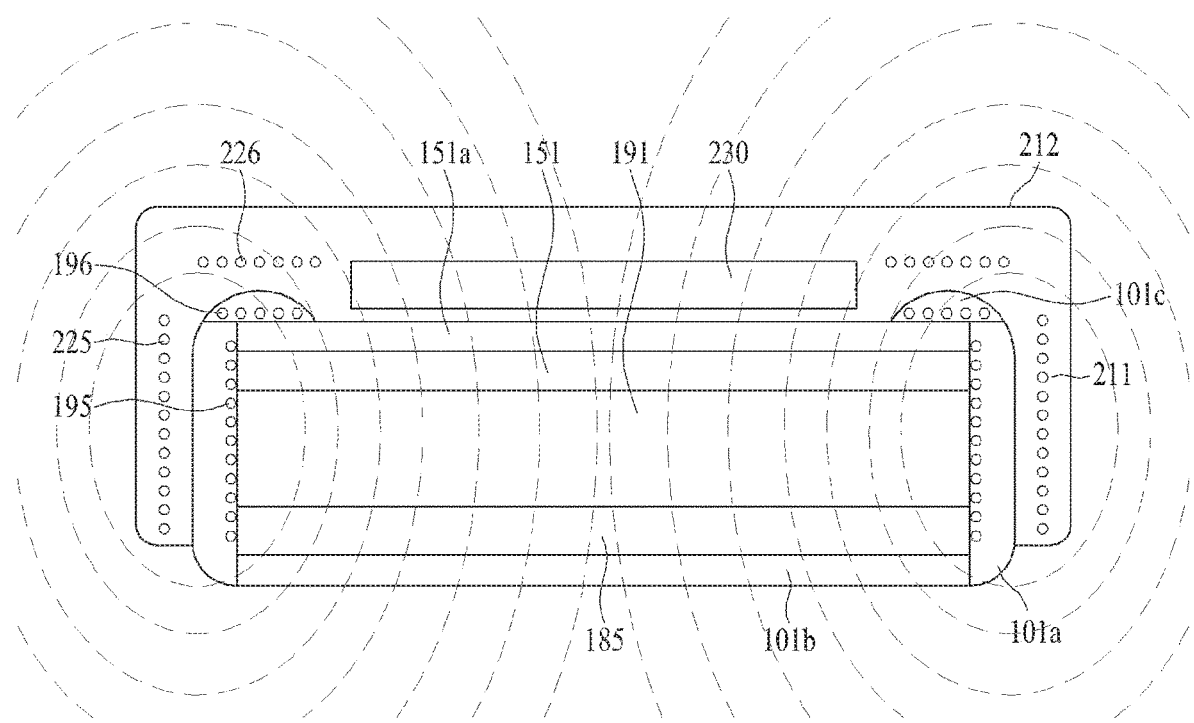

FIGS. 4 to 6 are diagrams illustrating an embodiment of a watch-type mobile terminal 100 and a wireless charging device according to the present invention. A cross section of the main body 101 of the watch-type mobile terminal 100 according to the present invention is shown in the drawing. The display unit 151 is positioned at the front side of the watch-type mobile terminal 100 and a window class 151a covering the display unit 151 is positioned at the front side. The battery 191 and the printed circuit board 185 are positioned at the rear side of the display unit 151.

FIG. 4 illustrates an embodiment regarding a first wireless charging coil 195 positioned at the first case 101a and FIG. 5 illustrates an embodiment regarding a second wireless charging coil 196 positioned at the third case 101c and a third wireless charging coil positioned at the window glass 151a. FIG. 6 illustrates an embodiment regarding the watch-type mobile terminal 100 equipped with the first wireless charging coil 195 and the second wireless charging coil 196.

Wireless charging coils 195, 196, 197, 198 can be positioned at the upper part of the watch-type mobile terminal 100 except a rear side, i.e., the second case 101b, of the watch-type mobile terminal 100 contacted with a wrist of a user. Since a human body influences on a magnetic field, it is preferable to deploy the wireless charging coils to a position away from a wrist of a user.

Referring to the embodiment of FIG. 4, the first wireless charging coil 195 can be deployed to the front side of the main body 101, i.e., the third case 101c direction, only. The first wireless charging coil 195 has a radius similar to a radius of a unit coil winded in a circle form and is winded in a manner of being slanted in a thickness direction. In particular, it may use a spiral coil of a three dimensional shape such as a coil spring.

The wireless charging device 200 includes a first housing 211 configured to wrap at least a part of the side of the main body 101 of the watch-type mobile terminal 100 and a second housing 212 positioned at the upper side of the main body 101. The first power transmission coil 225 is positioned at the first housing 211. Similar to the wireless charging coil 195, it may have power transmission coils 225, 226, 228 of a shape of winding up in a thickness direction of the watch-type mobile terminal 100 such as a coil spring.

The first power transmission coil 225 and the first wireless charging coil 195 have a difference in a diameter and have a similar shape. In order to form a magnetic field of a sufficient size, it may be able to make the thickness of the first power transmission coil to be thicker. In particular, the number of winding the first power transmission coil 225 can be greater than the number of winding the second wireless charging coil 196. Or, a coil thicker than the second wireless charging coil 196 can be used for the first power transmission coil 225.

An auxiliary battery 230 embedded in the wireless charging device 200 supplies power to the first power transmission coil 225 to make electric current flow on the first power transmission coil 225 and the electric current forms a magnetic field represented as dotted lines. The first wireless charging coil 195 is charged by the magnetic field. The auxiliary battery 230 can be deployed to the second housing 212 or an outside of the first power transmission coil 225 positioned at the first housing 211.

FIG. 5 illustrates a second wireless charging coil 196 positioned at the third case 101c and a third wireless charging coil 197 positioned at the window glass 151a. The second wireless charging coil 196 and the third wireless charging coil 197 are formed in a flat structure. An end of one side is positioned at the inner side of a spiral and an end of another side is positioned at the outside of the spiral.

Although it is depicted as the second wireless charging coil 196 is positioned at the inside of the third case 101c, the second wireless charging coil can be positioned between the first case 101a and the third case 101c or between the window glass 151a and the third case 101c.

The third wireless charging coil 197 can be positioned at the window glass 151a. If the third wireless charging coil is positioned between the window glass 151a and the display unit 151 or the window glass 151a is used by a member configured by a plurality of layers, the third wireless charging coil 197 can be formed in the inside of the window. If the third wireless charging coil 197 is positioned at up to an activated area on which an image of the display unit 151 is outputted, the third wireless charging coil 197 can be implemented using such a transparent and conductive material as ITO (Indium Tin Oxide).

If a touch sensor is installed in the front side of the display unit 151, the touch sensor can be equipped with the third wireless charging coil 197. Since an electrode of the touch sensor is also formed by ITO (Indium Tin Oxide), the third wireless charging coil and the touch sensor can be formed at the same time. The touch sensor and the window glass 151a can be formed by a unibody.

In order to charge the second wireless charging coil 196 and the third wireless charging coil 197, the power transmission coils 225, 226, 228 of the wireless charging device 200 of the present embodiment can include the second power transmission coil 226 that covers at least a part of the upper side of the second wireless charging coil 196 and the third wireless charging coil 197. It may be preferable to form a width of the second power transmission coil 226 to be wider than widths of the second wireless charging coil 196 and the third wireless charging coil 197. Since the second power transmission coil 226 of the present embodiment is positioned at the second housing 212, which is positioned at the front side of the main body 101, the auxiliary battery 230 can be deployed to the second housing 212.

An embodiment of FIG. 6 illustrates a watch-type mobile terminal 100 including all of the first wireless charging coil 195 and the second wireless charging coil 196. A wireless charging device 200 includes a first power transmission coil 225 configured to supply power to the first wireless charging coil 195 and a second power transmission coil 226 configured to supply power to the second wireless charging coil 196.

The first power transmission coil 225 is positioned at the first housing 211 and the second power transmission coil 226 is positioned at the second housing 212. Hence, the auxiliary battery 230 can be deployed by utilizing a space of the inside of the second power transmission coil 226. Although there is a problem of blocking the display unit 151, the battery 191 can be more quickly charged compared to other embodiments.

A wireless charging device 200 equipped with the first power transmission coil 225 is used for the first wireless charging coil 195 and a wireless charging device 200 equipped with the second power transmission coil 226 can be used for the second wireless charging coil 196 or the third wireless charging coil 197. The watch-type mobile terminal 100 of the present invention includes all embodiments selectively equipped with the first wireless charging coil 195, the second wireless charging coil 196, and the third wireless charging coil 197.

Figure 7:
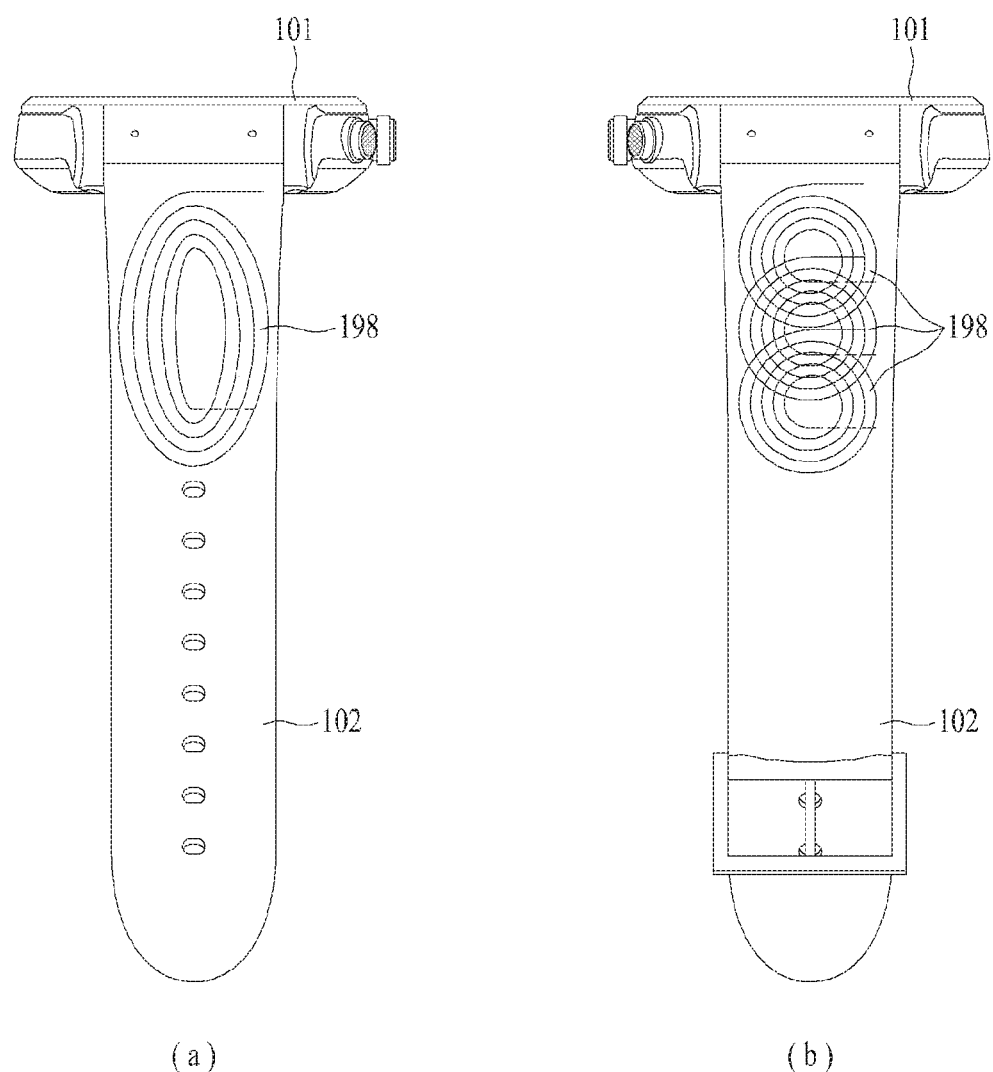
FIG. 7 is a diagram illustrating a different embodiment of a watch-type mobile terminal according to the present invention.
Figure 8:
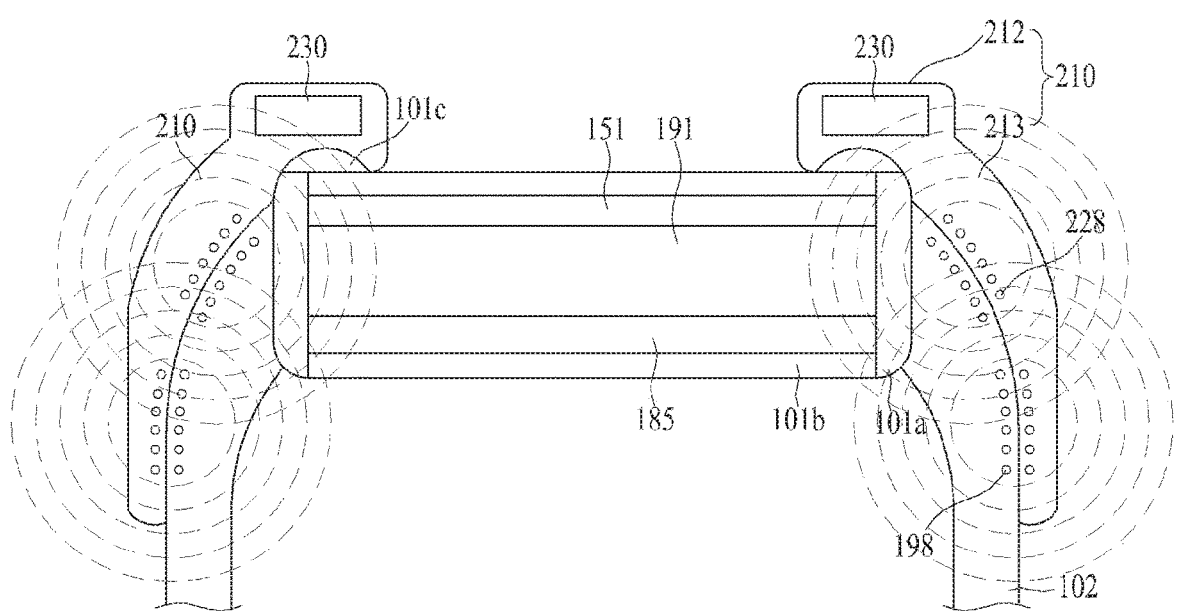
FIG. 8 is a diagram illustrating a different embodiment of a watch-type mobile terminal and a wireless charging device according to the present invention.

FIG. 7 is a diagram illustrating a different embodiment of a watch-type mobile terminal 100 according to the present invention. FIG. 8 is a diagram illustrating a different embodiment of a watch-type mobile terminal 100 and a wireless charging device according to the present invention.

Unlike the aforementioned embodiments, wireless charging coils 195, 196, 197, 198 of the present embodiment include a fourth wireless charging coil 198 positioned at the band 102. As shown in FIG. 7, the fourth wireless charging coil 198 can be deployed to a position adjacent to the main body 101. As shown in FIG. 7 (a), the fourth wireless charging coil 198 can include a single coil only. Or, as shown in FIG. 7 (b), the fourth wireless charging coil 198 can include a plurality of coils. When the fourth wireless charging coil 198 includes a plurality of coils, if electric current flows on one of a plurality of the coils, although power transmission coils 225, 226, 228 of a wireless charging device are not deployed to a correct position, it may be able to charge the watch-type mobile terminal.

In this case, as shown in FIG. 8, the wireless charging device 200 includes a third housing 213 covering the band part 102 of the watch-type mobile terminal 100. The third housing 213 covers the fourth wireless charging coil 198 positioned at the band 102. Electric current flows on the fourth wireless charging coil 198 by a magnetic field (dotted lines) formed by the fourth power transmission coils 225, 226, 228 and the battery 191 is charged. The battery 191 can be deployed to the second housing 212 positioned at the front side of the main body 101.

As mentioned in the foregoing description, according to one embodiment of the present invention, it is able to charge the watch-type mobile terminal 100 in a state of being worn on a wrist without separating the watch-type mobile terminal 100 from the wrist. Since it is able to minimize an electromagnetic wave influenced by a human body due to a distance from the wrist, it is able to enhance a charging efficiency.

Moreover, since it is able to apply not only to a magnetic induction scheme but also to a magnetic resonance scheme, it is able to apply various charging methods.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A wireless charging device configured to be coupled to a watch-type mobile terminal containing at least one wireless charging coil positioned at a front or a side of the watch-type mobile terminal or a band of the watch-type mobile terminal, the wireless charging device comprising:
    a charging device housing configured to cover at least a part of the watch type mobile terminal;
    a power transmission coil of a spiral form deployed along a circumference of the charging device housing; and
    an auxiliary battery configured to supply power to the power transmission coil,
    wherein the charging device housing comprises:
        a first housing covering at least a part of the side of the watch-type mobile terminal coupled to the wireless charging device; and
        a second housing covering at least a part of the front of the watch-type mobile terminal coupled to the wireless charging device,
    wherein the power transmission coil comprises:
        a first power transmission coil positioned at the first housing; and
        a second power transmission coil positioned at a circumference part of the second housing, and
    wherein the auxiliary battery is embedded in the second housing and is positioned inside of the second power transmission coil.

2. The wireless charging device of claim 1, wherein the first power transmission coil is wound in a shape of a cylinder.

3. The wireless charging device of claim 1, wherein the second housing comprises an opening formed at a center position corresponding to a display unit positioned at the front side of the main body.

4. The wireless charging device of claim 1, wherein a bottom part of the first housing corresponding to a band part of the watch-type mobile terminal is recessed.

5. The wireless charging device of claim 1, wherein the charging device housing further comprises a third housing coupled with an upper side of the band of the watch-type mobile terminal, wherein the power transmission coil is positioned at the third housing, and wherein the auxiliary battery is positioned at the first housing or the second housing.

* * * * *